United States Patent Office 3,709,769
Patented Jan. 9, 1973

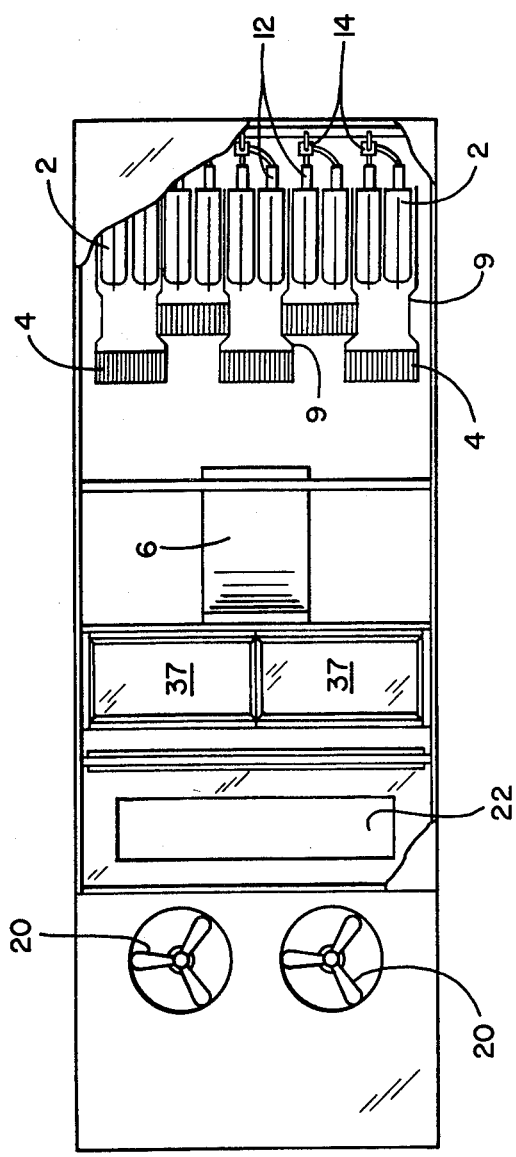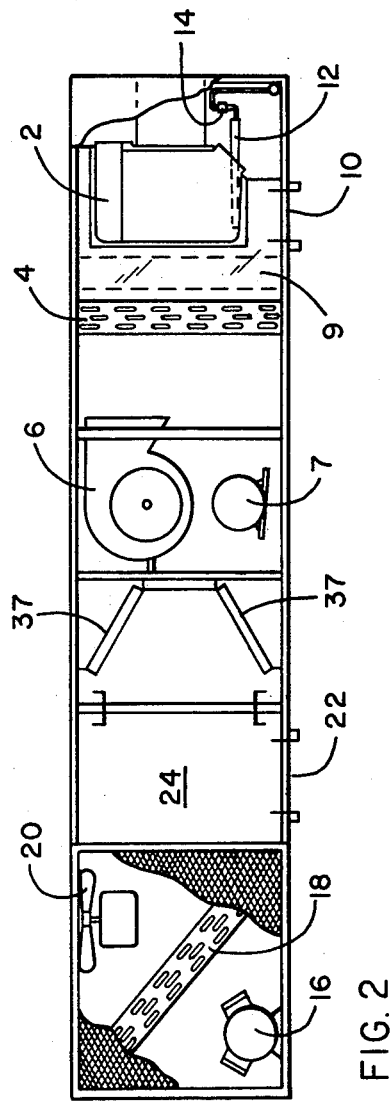

3,709,769
CONTROL FOR AIR-CONDITIONING APPARATUS
Russell E. Wood, East Syracuse, N.Y., assignor to
Carrier Corporation, Syracuse, N.Y.
Filed Apr. 30, 1971, Ser. No. 139,090
Int. Cl. F24f 3/00
U.S. Cl. 161—22
4 Claims

ABSTRACT OF THE DISCLOSURE

A control arrangement for an air-conditioning system adapted to serve a plurality of zones, a master control being provided in the control arrangement to energize and deenergize the zone thermostats, the master control energizing the individual zone thermostats in response to a preselected temperature variation from the zone thermostat set point in a representative zone, deenergization of the zone thermostats by the master control allowing the temperature in each of the zones to increase or decrease from the zone thermostat set point and reduce the load on the air-conditioning system for weekend and nighttime operation.

BACKGROUND OF THE INVENTION

To reduce the operating costs of an air-conditioning system, it is desirable to reduce the load on the system when the building served thereby is not in use. In most instances, this would ordinarily entail a temperature reduction at night and on weekends during the heating season and a temperature increase at night and on weekends during the cooling season.

In air-conditioning installations serving a plurality of zones wherein each zone is provided with a thermostat to maintain the desired temperature in the zone, each zone thermostat may be manually adjusted to provide the desired temperature increase or decrease at night and on weekends. However, this is time consuming. Further, the thermostats must be reset to the desired temperature a number of hours before the building is to be occupied to allow time for the air-conditioning system to increase or decrease the zone temperatures to the desired level.

SUMMARY OF THE INVENTION

This invention relates to a control arrangement for an air-conditioning system serving a plurality of zones, each zone being provided with a thermostat to maintain the desired temperature in the zone served thereby. A master thermostatic control means, responsive to the temperature in a zone having heat gains and heat losses representative of the heat gains and heat losses in the remainder of the zones, when actuated, deenergizes the individual zone thermostats when the temperature of the representative zone is at a predetermined temperature variation from the zone thermostat set point, the master thermostatic control means energizing each of the zone thermostats when the temperature of the representative zone decreases below the predetermined temperature during the heating season or when the temperature of the representative zone increases above the predetermined temperature during the cooling season.

BRIEF DESCRIPTION OF THE DRAWINGS

FIG. 1 is a plan view of an air-conditioning apparatus with portions of the cover broken away to illustrate internal components;

FIG. 2 is a view partly in section and partly in elevation of the apparatus of FIG. 1.

DESCRIPTION OF THE PREFERRED EMBODIMENT

Figure 3:
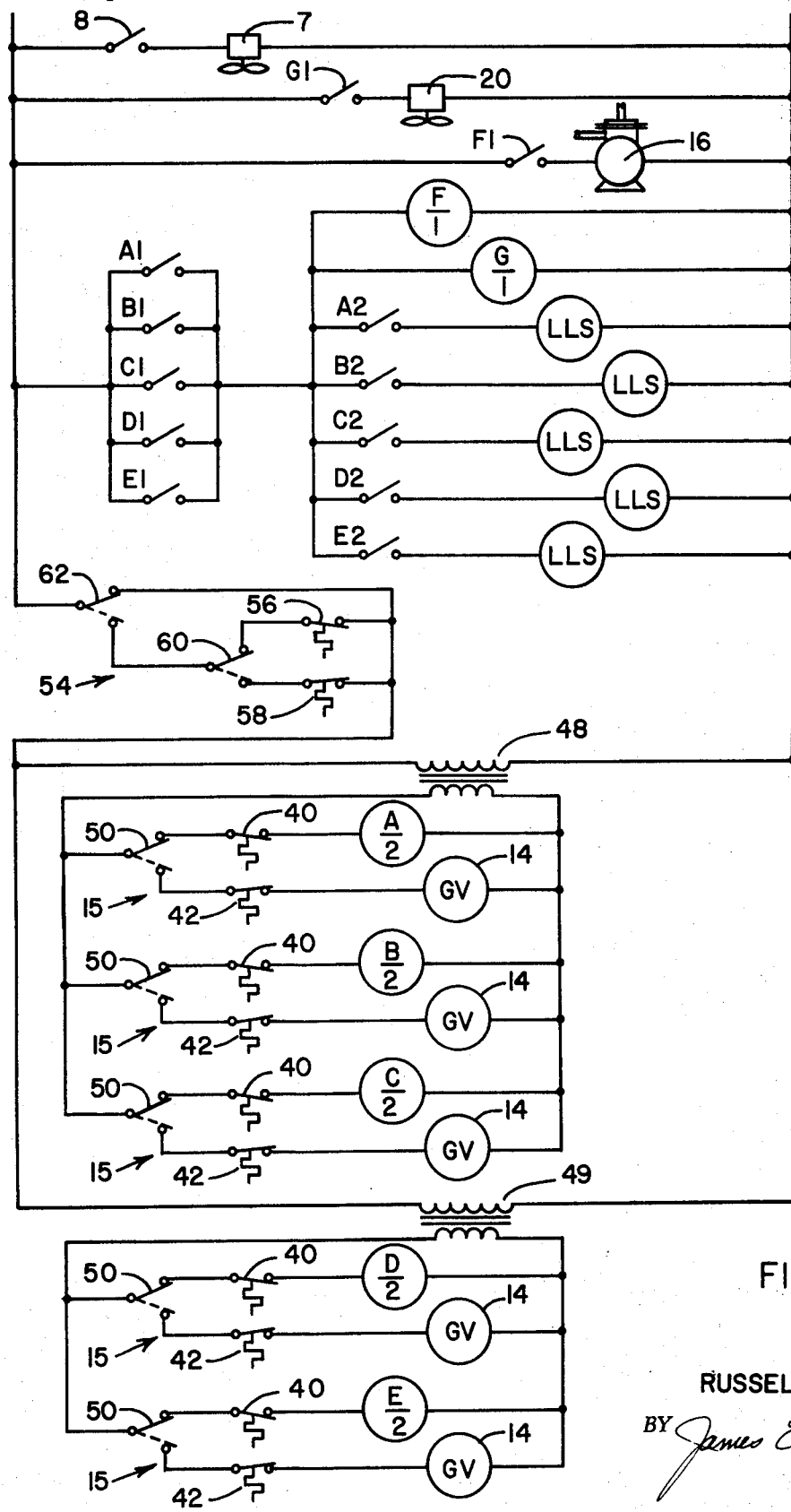
FIG. 3 is a schematic view of the control system for the air-conditioning apparatus of FIGS. 1 and 2.

Referring to the drawing, there is illustrated an air-conditioning apparatus adapted to serve a plurality of zones in a building to provide individual temperature control in each zone. A plurality of direct-fired heat exchangers 2 for heating air and a plurality of refrigerant coils 4 are provided. A fan 6 and fan motor 7 are provided to circulate air over the evaporator coils and heat exchanger. Suitable switch means 8 (FIG. 3) are provided to complete the electrical circuit to fan motor 7 to energize the motor.

The unit illustrated is adapted to serve up to five individual zones. To accomplish this, baffles 9 are located to provide five separate air passages downstream from fan 6. Each passage contains a single refrigerant evaporator coil 4 and two direct fired heat exchangers 2. While a single evaporator coil and two direct-fired heat exchangers are illustrated in each air passage, it should be understood that any desired number of evaporator coils 4 and heat exchangers 2 could be located in each passage formed by baffles 9. Further, electric resistance elements or other well-known types of heating means could be employed in place of the direct-fired heat exchangers 2. Each air passage is provided with a discharge opening 10, only one of which is visible in FIG. 2.

The conditioned air from each discharge opening 10 may be supplied to the individual zone to be served thereby. While each passage containing an evaporator coil 4 and two heat exchangers 2 may serve a single zone, in many applications a number of discharge openings may be connected to a common duct to serve a zone requiring a greater heating and cooling capacity than could be provided by a single evaporator coil and two heat exchangers.

Each heat exchanger 2 is provided with a fuel burner 12 and a fuel valve 14 adapted for energization by thermostatic control means located in each zone served by the air-conditioning apparatus.

A refrigerant compressor 16 and a condenser 18 are provided to supply liquid refrigerant to the evaporator coils 4. Each evaporator coil 4 is provided with a refrigerant liquid line solenoid valve LLS (FIG. 3) to control the flow of refrigerant from the condenser 18 to the coils. The liquid line solenoid valves LLS are also controlled by thermostatic control means located in each zone served by the air conditioning apparatus. Fan means 20 are provided to circulate ambient air over condenser 18 to condense the refrigerant therein.

Air from the individual zones is returned to the apparatus through opening 22 into a chamber 24. Fan 6 draws air from chamber 24 through filters 37 for passage over heat exchangers 2 and evaporator coils 4 prior to passage to the individual zones.

FIG. 3 illustrates the control arrangement for the aforementioned air-conditioning apparatus for an installation where the apparatus is adapted to serve five zones, each zone being served by a single evaporator coil 4 and the two heat exchangers 2 associated therewith.

Thermostatic control means 15, including a temperature responsive switch 40 and a temperature responsive switch 42 are disposed in each zone served by the air conditioning apparatus. The thermostatic control means 15 are connected in control circuits provided with 24 volt current by transformers 48 and 49. The thermostatic control switches 40 are adapted to energize control relays A/2, B/2, C/2, D/2, and E/2. Relay A/2 is provided with switches A1 and A2, relay B/2 is provided with switches B1 and B2, relay C/2 is provided with switches C1 and C2, relay D/2 is provided with switches D1 and D2 and relay E/2 is provided with switches E1 and E2.

Each of the temperature responsive switches 42 is adapted to energize the gas valve 14 associated therewith.

When heating is required in a zone served by one of the thermostatic control means 15, the heating-cooling switch 50 associated therewith is moved to the heating position as illustrated by the dotted line to provide current to thermostatic switch 42. Upon a drop in the temperature of the zone, switch 42 will close to provide current to the gas valve 14 associated therewith and provide gas to the burners serving the zone to provide heat thereto.

When cooling is required in one of the zones served by the air-conditioning apparatus, the heating-cooling switch 50 associated with the zone will be positioned as shown by the solid line to provide current to thermostatic switch 40. Upon a rise in temperature of the zone, the switch 40 will close to provide current to the relay associated therewith. Energization of the relay will cause the switches within the relay to close, thereby providing current to the liquid line solenoid valve associated therewith to open the valve and allow passage of liquid refrigerant from condenser 18 to the coil 4 serving the zone. Relays F/1 and G/1 will also be energized by the closing of the relay switch; energization of relay F/1 closing switch F1 associated therewith to energize the compressor 16, energization of relay G/1 closing switch G1 to energize condenser fans 20. Thus, upon a demand for cooling in any of the zones served by the apparatus, the compressor and condenser fan will be energized and the liquid line solenoid valve (LLS) associated with the zone will be opened to allow passage of liquid refrigerant from the condenser to the evaporator coil 4 serving the zone.

During periods when the building is not in use; such as nights and weekends, it is desirable to reduce the load on the air-conditioning system. This may be accomplished during the heating season by allowing the temperature of the zones to drop below the normal temperature maintained in the zones and during the cooling season by allowing the temperature of the zones to rise above the normal temperature maintained in the zones. To accomplish this, a suitable master thermostatic control 54 is provided within a zone served by the apparatus having heat gains and heat losses representative of the heat gains and heat losses in the remainder of the zones. The master thermostatic control 54 is provided with thermostatic switches 56 and 58 and a heat-cool switch 60. A night set back switch 62 is provided for reasons to be hereinafter explained. During normal daytime operation, switch 62 is positioned as shown by the solid line to bypass thermostatic control 54, thereby providing current to the temperature responsive means 15 serving the zones. The switch 62 may be manually controlled or may be controlled by suitable timer means to automatically move the switch between the solid line position and the dotted line position on a preselected time schedule.

When switch 62 is in the position illustrated by the dotted lines, thermostatic control 54 is placed in the control circuit for the air-conditioning system. When heating is required in the zone containing thermostatic control 54, the heating-cooling switch 60 is moved to the heating position as illustrated by the dotted line to provide current to thermostatic switch 58. Switch 58 will be adjusted to open at a preselected temperature below the temperature at which the thermostatic switch 42 located within the same zone will open. Thus, when switch 62 is in the position illustrated by the dotted line, the thermostatic switch 58 will open the electrical circuit to all of the thermostatic control means 15 to prevent operation of the heating means or the cooling means unless the temperature of the zone containing thermostatic control 54 drops below the preselected temperature.

When cooling is required in the zone containing thermostatic control 54, the switch 60 will be positioned as shown by the solid line to provide current to thermostatic switch 56. Thermostatic switch 56 will be adjusted to close at a preselected temperature above the temperature at which the thermostatic switch 40 in the zone containing thermostatic means 54 is set. Thermostatic switch 56 will thus open the circuit to all of the thermostatic control means 15 unless the temperature in the zone containing thermostatic control 54 increases to the preselected temperature at which switch 56 closes. Upon the closing of switch 56, current will be provided to all the thermostatic control means 15.

It can be seen from the foregoing that the thermostatic control means 54, when energized by switch 62, will maintain the zone containing thermostatic control means 54 at a pre-selected temperature above the normal zone temperature when the zone requires cooling and maintain the zone at a preselected temperature below the normal temperature when the zone requires heating. Since thermostatic control means 54 energizes and deenergizes the thermostatic control means located in all the zones served by the air-conditioning apparatus, and the heat gains and heat losses in the zone containing thermostatic control means 54 are representative of the heat gains and heat losses in the remaining zones, thermostatic control means 54, by energizing and deenergizing the thermostatic control means 15, will allow the temperature in the remaining zones to increase above the normal temperature when the zones require cooling and decreasing below the normal temperature when the zones require heating.

It should be understood that during the intermediate seasons, a number of zones may require cooling and a number of zones may require heating. When thermostatic control 54 energizes the zone thermostats, each zone thermostat set for cooling operation will energize the cooling coil associated therewith if the temperature of the zone is above the zone thermostat set point, while the zone thermostats set for heating will energize the heating elements associated therewith if the temperature of the zone is below the zone thermostat set point.

When the thermostatic control 54 is satisfied, all of the zone thermostats will be deenergized.

The temperature of the representative zone will be maintained at the set point of thermostatic control 54 when control 54 is energized. Since the control 54 is responsive to the temperature in a representative zone, the temperature in the remainder of the zones will vary from the zone thermostat settings to a degree approximating the temperature differential between the set point of thermostatic control 54 and the set point of the zone thermostat in the representative zone.

While I have described a preferred embodiment of my invention, it is to be understood that my invention is not limited thereto but may be otherwise embodied within the scope of the following claims:

I claim:

1. A control arrangement for an air-conditioning system serving a plurality of zones comprising:
    a plurality of thermostats disposed in the zones served by the air-conditioning system, each thermostat maintaining the desired temperature in the individual zone served thereby,
    a master thermostatic control means to regulate said thermostats responsive to a predetermined temperature,
    means for actuating said master thermostatic control means, said master thermostatic control means being responsive to temperature in a zone having heat gains and heat losses representatvies of the heat gains and heat losses in the remainder of the zones, said master thermostatic control means deenergizing the thermostats when the representative zone is at the predetermined temperature, said master thermostatic control means energizing each of said thermostats when the temperature of the representative zone decreases below the predetermined temperature and the zone requires heating.

2. A control arrangement according to claim 1 in which said master thermostatic control means is adapted to energize each of said thermostats when the temperature of the representative zone increases above the predetermined temperature and the zone requires cooling.

3. A control arrangement according to claim 2 in which each of said thermostats includes a first temperature responsive switch for activating heating means in the air-conditioning system:
   a second temperature responsive switch for activating cooling means in the air-conditioning system, and
   switch means to selectively energize said first temperature responsive switch and said second temperature responsive switch.

4. A control arrangement according to claim 4 in which said master thermostatic control includes a first thermostatic switch adapted to open upon a rise in temperature,
   a second thermostatic switch adapted to open upon a drop in temperature, and
   master switch means to selectively energize said first thermostatic switch and said second thermostatic switch.

References Cited
UNITED STATES PATENTS

| | | | |
|---|---|---|---|
| 3,051,451 | 8/1962 | Bierwirth et al. | 165—22 |
| 3,116,786 | 1/1964 | Menditch | 165—22 |

CHARLES SUKALO, Primary Examiner

U.S. Cl. X.R.

165—26